(No Model.)
J. W. HYATT.
ART OF FILTRATION.
No. 293,749. Patented Feb. 19, 1884.
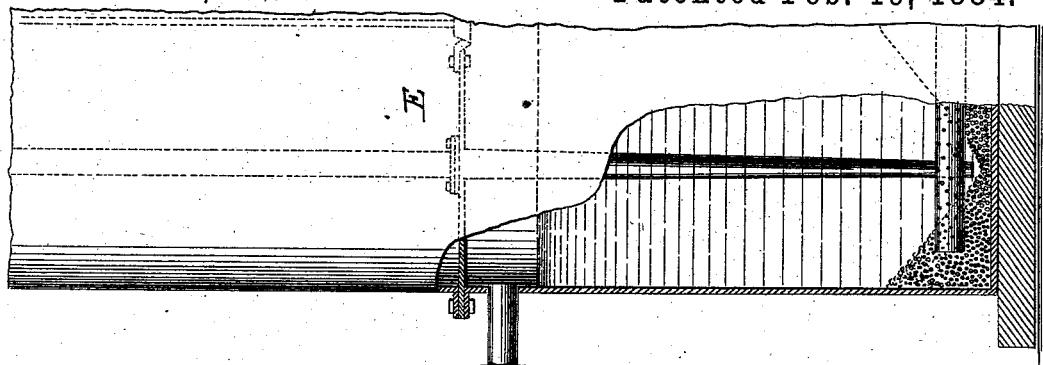
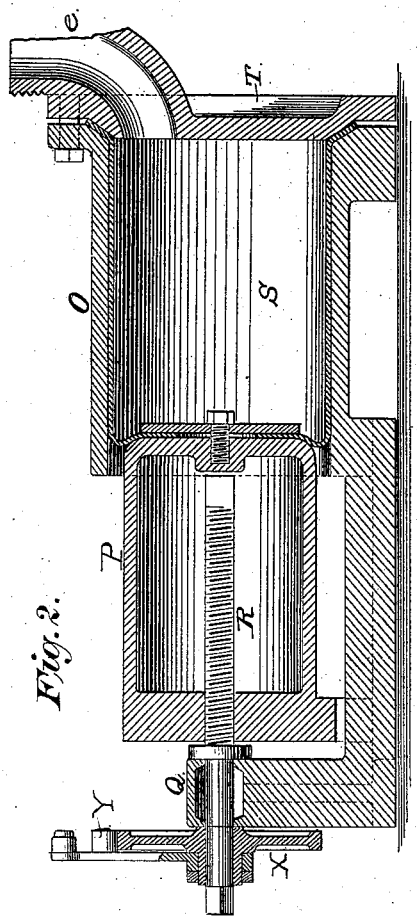
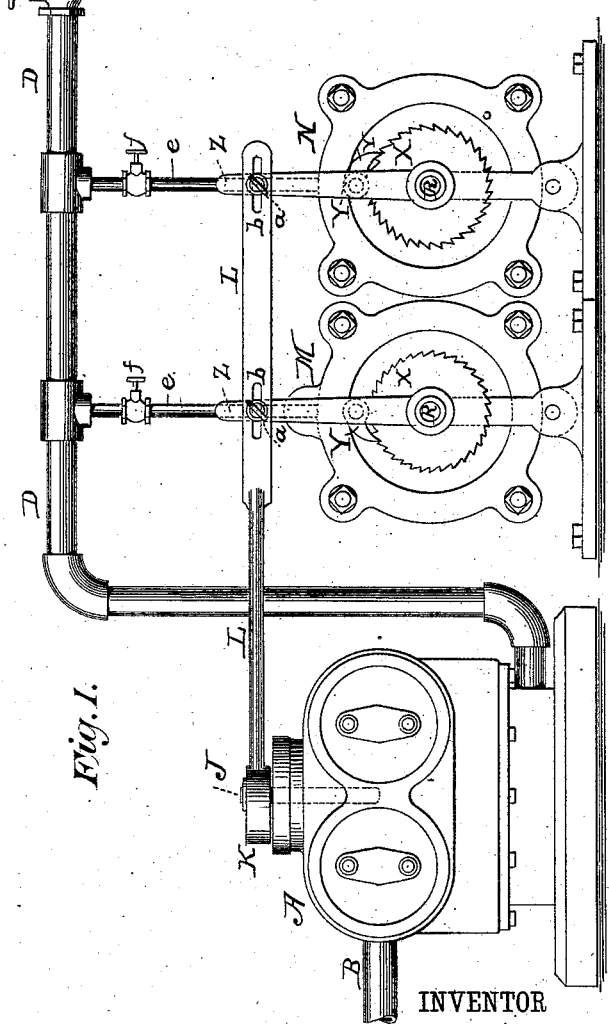
WITNESSES:
Gustave Dieterich
Herman Gustow
INVENTOR
John W. Hyatt,
BY Chas. O. Gill
ATTORNEY

UNITED STATES PATENT OFFICE.

JOHN W. HYATT, OF NEWARK, NEW JERSEY.

ART OF FILTRATION.

SPECIFICATION forming part of Letters Patent No. 293,749, dated February 19, 1884.

Application filed November 3, 1883. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Filtration, of which the following is a specification.

The invention relates to improvements in the art of filtration; and it consists, first, in coagulating the impurities and preventing any excess of the coagulant from passing off in solution with the escaping water during a continuous process of filtering through a filter-bed composed of material in comminuted form; second, in a sub-method in which iron or its compounds as coagulants, and lime as a precipitant, are employed; and, third, in a novel apparatus for giving effect to the invention sought to be protected hereby, all as hereinafter fully described, and particularly pointed out in the claims.

I particularly recommend that metallic iron and lime, either independently or combined, may be employed as a coagulant and precipitant, owing to their effectiveness for the purposes mentioned, the readiness with which they may be applied, and also in an economic point of view. I shall prepare the iron for use by obtaining iron borings, for convenience and economy, and reduce them by an ordinary paint-mill having burr-stones, or by an attrition-mill, or otherwise, to as near as may be an impalpable powder. In the employment of a paint-mill for this purpose the iron should be mixed with lime and water in the proportion of, say, two parts of iron to one part of lime and three parts of water, by weight. The iron and lime may be pulverized while in a dry state by an attrition-mill, the water being afterward applied to give the mass a semi-liquid consistency. The iron and lime, after having been treated as described, is placed in the ejector, for introduction into the pipe supplying water to the filter. Too much importance cannot be given to iron and lime for the purposes stated, whether said materials are employed in a continuous process such as that described, or in a process in which the impurities are coagulated in a tank, the liquid being afterward passed through a bed of filtering material. The coagulating material—such, for example, as comminuted iron—and the precipitant—as, for instance, lime—may be introduced into the supply-pipe either at or prior to the entrance of the water into the filter. In all cases where the nature of the coagulant and precipitant will permit, they may be combined, and thus injected together into the water to be purified. The method of effecting the coagulation of the impurities and of preventing any excess of coagulant from passing off in solution with the escaping water will appear in full hereinafter in connection with the description of the apparatus whereby the invention is made use of.

In the accompanying drawings I illustrate an apparatus of novel construction, and the proper use of which involves an application of the invention sought to be protected hereby.

In said drawings, Figure 1 is a plan view of an apparatus embodying the invention; and Fig. 2 is a central vertical longitudinal section of one of the ejectors forming a part of the said apparatus, and hereinafter described.

A denotes a water meter or pump, which may be of any usual construction, having an inlet for water at B and an outlet at C. The outlet-pipe connects with the supply or inlet D to the filter E, a valve, F, being supplied in the inlet-pipe D, for the purpose of regulating the flow of the liquid.

The filter E is the usual two-story filter constructed on the principle described in Letters Patent of the United States granted to me March 6, 1883, and numbered 273,542, and as embodied in several pending applications, one of which was filed on the 1st day of August, 1883.

J represents the usual rotating spindle of the water-meter A, and upon its upper end is applied a driving-eccentric, K, which is connected with and actuates, when in motion, the rod L, hereinafter described. At a convenient relation to the filter are arranged the ejectors M and N, each of which consists of the cylinder O, a piston, P, a head, Q, which carries the screw R, and a rubber bag or diaphragm, S, open at both ends when detached. The diaphragm S, when expanded, snugly fills the cylinder O, as shown in Fig. 2. The edges of one of its ends are firmly secured by the head T of the cylinder, while the opposite end of the diaphragm is affixed by a plate and screw to the inner end of the piston P. The screw R is engaged by an aperture formed in the head of the piston, which is made hollow, so as to permit of its having a horizontal movement on the screw. Upon the outer portion of the screw R is rigidly applied the ratchet-wheel X, which is engaged by the pawl Y, secured upon the vertical lever Z, the lower end of the lever being loosely fitted upon a sleeve secured upon the outer portion of the screw R. The outer extremity of the screw R projects through the ratchet-wheel X, and is suitably squared to permit of its engagement by a hand wheel or crank when desired. The upper part of the lever Z of each ejector is supplied with a set-screw or analogous device, $a$, by means of which it is connected with the eccentric-rod L, the rod being slotted at $b$, so as to afford a means of attachment to the levers. The interior surface of the cylinder O and the exterior surface of the piston P are protected from contact with the sulphate of iron or other material employed as a coagulant or precipitant by the flexible diaphragm S. From the rear end of the cylinder O, and at its upper portion, passes the ejector-pipe $e$ to the supply-pipe D, as indicated, each ejector-pipe being provided with a check-valve, $f$. The water to be purified passes through the meter A and pipe D into the filter, and at the same time suitable proportionate quantities of the sulphate of iron and the paste of lime (when these materials are used as coagulating and precipitating agents) are ejected through the pipes $e$ into the pipe D, the quantity depending, mainly, upon the volume and quality of water passing through the meter A, and being regulated by the extent of the movement of the piston P. The water passing through the meter actuates the gage-spindle J in the usual manner, and this communicates motion to the driving-eccentric K, which in turn imparts a reciprocating movement to the rod L and levers Z. The movement of the levers Z operates through the pawls Y to rotate slowly and at regular intervals the ratchet-wheels X, and these wheels, being rigidly affixed upon the screws R, cause the rotation of the same, whereby the piston P is given a horizontal movement toward or from the cylinder, according as the screws R are turned to the right or to the left. The rubber bags or diaphragms are charged with the material by removing the heads T, the pistons P being first drawn to the extreme of their forward movement. It will appear obvious that when the pistons are gradually moved toward the heads T, through the operation of the pawl Y and ratchet X upon the screw R, the material within the bags or diaphragms will be gradually forced upward through the pipes $e$ and be discharged into the supply-pipe D.

I do not limit myself to the apparatus hereinbefore described, as it is only one of many constructions which might be devised for carrying out the process part of the present invention. It is, however, a very desirable form, and I recommend its employment for the regularity and effectiveness of its operation.

In instances where the precipitant and the coagulant are independently injected into the supply-pipe at or prior to the entrance of the liquid into the filtering apparatus, I will place the coagulating material in the injector M and the precipitant in the ejector N, and proceed with the operation of the apparatus as hereinbefore described. I shall by preference employ the coagulating and precipitating substances in the form of a paste or thick sirup, the materials being ground in water and concentrated as much as possible. When metallic iron is employed as the coagulant, the two substances will be introduced into a single ejector and by it forced into the supply-pipe D. Any of the iron preparations—such as perchloride of iron, persulphate of iron, or sulphate of iron—may be utilized alone as a coagulant in the filtering process; but I have found that when lime is employed in addition thereto, a reduced quantity of the iron may be used. When sulphate of iron is used as the coagulant, it will be ground with clay and water, in the proportion of eight parts of the salt to one part of clay and two parts of water, forming a paste, in which condition it may be placed in the injector.

In lieu of the lime in the process hereinbefore described, I may employ any alkaline carbonate or bicarbonate or caustic alkali with good results. Sulphate of zinc or chloride of zinc may also be mentioned as additional coagulants.

What I claim as my invention, and desire to secure by Letters Patent, is—

1. In the art of filtration, the method hereinbefore described of coagulating and arresting the impurities and of preventing any of the coagulating agents in solution passing off with the filtered water, which method consists, first, in introducing into the water prior to or at its entrance into the apparatus a substance which will produce coagulation, and then a substance which will operate to precipitate the excess of the coagulant and prevent any of the same in solution from passing off with the water, and finally allowing the water to pass through a bed of filtering material.

2. In the art of filtration, the method hereinbefore described of coagulating and arresting the impurities and of preventing any of the coagulating material from passing off in solution with the filtered water, which method consists in introducing iron and lime, substantially as described, into the water prior to or at its entrance into the apparatus, and then allowing the water to pass through a bed of filtering material.

3. The combination of a filter, an ejector consisting of a cylinder and piston, and being in communication with the supply-pipe of the filter, and a motor for actuating the piston of the ejector, substantially as set forth.

4. The ejector consisting of the cylinder, piston, screw, and escape-pipe, in combination with a filter and means for actuating the screw simultaneously with the flow of water to the filter, substantially as set forth.

5. The ejector consisting of the cylinder, hollow piston, flexible bag or diaphragm, screw, pawl, and ratchet, substantially as set forth.

Signed at New York, in the county of New York and State of New York, this 24th day of October, A. D. 1883.

JOHN W. HYATT.

Witnesses:
CHAS. C. GILL,
HERMAN GUSTOW.